United States Patent [19]
Fishback et al.

[11] Patent Number: 5,384,338
[45] Date of Patent: Jan. 24, 1995

[54] CFC AND HCFC-FREE RIGID INSULATING FOAMS HAVING LOW-K FACTORS AND DECREASED FLAMMABILITY

[75] Inventors: Thomas L. Fishback, Gibraltar; Curtis J. Reichel, Southgate; James S. Dailey, Trenton, all of Mich.

[73] Assignee: BASF Corporation, Parsippany, N.J.

[21] Appl. No.: 143,547

[22] Filed: Oct. 26, 1993

Related U.S. Application Data

[63] Continuation-in-part of Ser. No. 999,752, Dec. 31, 1992, abandoned.

[51] Int. Cl.$^6$ ................................................. C08J 9/14
[52] U.S. Cl. ..................................... 521/131; 521/172
[58] Field of Search .......................................... 521/131

[56] References Cited

U.S. PATENT DOCUMENTS

| | | | |
|---|---|---|---|
| 3,920,587 | 11/1975 | Watkinson | 521/131 |
| 3,922,238 | 11/1975 | Narayan et al. | 521/131 |
| 4,581,384 | 4/1986 | Marion | 521/131 |
| 5,089,534 | 2/1992 | Thoen et al. | 521/131 |
| 5,102,918 | 4/1992 | Moriya | 521/131 |

*Primary Examiner*—Morton Foelak
*Attorney, Agent, or Firm*—Paul L. MZarshall

[57] ABSTRACT

Polyurethane/polyisocyanurate foams with low K-factors and enhanced flammability properties as measured by the Butler Chimney test are produced through the use of a blowing agent composition comprising aliphatic hydrocarbon and a fully halogenated brominated halocarbon is a mole ratio of from 10:1 to 1:2.

14 Claims, No Drawings

CFC AND HCFC-FREE RIGID INSULATING FOAMS HAVING LOW-K FACTORS AND DECREASED FLAMMABILITY

This is a continuation in part of application Ser. No. 07/999,752 filed Dec. 31, 1992, abandoned.

FIELD OF THE INVENTION

The present invention pertains to rigid insulating foams prepared from the reaction of pentane blown methylene diphenylene diisocyanates and its higher ring content oligomers and polyols which exhibit low flammability while at the same time possessing low thermal conductivities. More particularly, the present invention pertains to polyurethane and polyisocyanurate foam systems employing a brominated halocarbon in addition to an aliphatic hydrocarbon as a blowing agent.

BACKGROUND OF THE INVENTION

Since the widespread adoption of the Montreal Protocol, the urethane industry has concentrated efforts directed to eliminating the use of chlorofluorocarbons, such as the widely used CFC-11, from polyurethane foam formulations of all types. The use of HCFC's such as HCFC-22, monochlorodifluoromethane, which have lower ozone depletion potentials (ODP's) has been promoted as an interim solution. However, HCFC-22, an HCFC of choice, is a gas at room temperature with poor system solubility, and thus extraordinary processing equipment must be used, including in some cases, pressurized day tanks.

Water has been utilized for many years in polyurethane and polyisocyanurate foam systems. However, the carbon dioxide generated by the water/isocyanate reaction is markedly inferior to the CFCs and HCFCs with respect to preparing rigid foams having low K-factors. To overcome this deficiency, it has been suggested to include perfluorocarbons (PFAs) in a water blown formulations. However PFAs are quite expensive despite being used in modest amounts; have exceptionally poor system solubility, often requiring emulsification rather than solution; and moreover offer only a modest advantage over all-water-blown systems.

Low-boiling aliphatic hydrocarbons have been suggested as blowing agents for polymeric foams, and are widely used in the expandable and expanded polystyrene industry. However, they have been eschewed by the polyurethane industry due to the flammability of the foams produced through their use, as well as the high K-factors obtained in rigid foams, making them undesirable for use in many applications.

SUMMARY OF THE INVENTION

It has now been surprisingly discovered that polyurethane and polyisocyanurate foams having low flammability characteristics may be achieved with aliphatic hydrocarbon-blown foams through the addition of bromohalocarbons in a bromohalocarbon to pentane molar ratio of greater than 0.1:1 or greater

DESCRIPTION OF THE PREFERRED EMBODIMENTS

The foams of the subject invention may be polyurethane foams or polyisocyanurate foams, with the latter preferred.

By the term "polyurethane" is meant a polymer whose structure contains predominately urethane

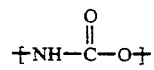

linkages between repeating units. Such linkages are formed by the addition reaction between an organic isocyanate group R—[—NCO] and an organic hydroxyl group [HO—]—R. In order to form a polymer, the organic isocyanate and hydroxyl group-containing compounds must be at least difunctional. However, as modernly understood, the term "polyurethane" is not limited to those polymers containing only urethane linkages, but includes polymers containing allophanate, biuret, carbodiimide, oxazolinyl, isocyanurate, uretidinedione, and urea linkages in addition to urethane. The reactions of isocyanates which lead to these types of linkages are summarized in the *Polyurethane Handbook*, Gunter Vertel, Ed., Hanser Publishers, Munich, Oc1985, in Chapter 2, pages 7–41; and in *Polyurethanes: Chemistry and Technology*, J. H. Saunders and K. C. Frisch, Interscience Publishers, New York, 1963, Chapter III, pages 63–118. In addition to polyols (polyhydroxyl-containing monomers), the most common isocyanate-reactive monomers are amines and alkanolamines. In these cases, reaction of the amino group leads to urea linkages interspersed within the polyurethane structure.

The urethane forming reaction is generally catalyzed. Catalysts useful are well known to those skilled in the art, and many examples may be found for example, in the *Polyurethane Handbook*, Chapter 3, §3.4.1 on pages 90–95; and in *Polyurethanes: Chemistry and Technology* in Chapter IV, pages 129–217. Most commonly utilized catalysts are tertiary amines and organotin compounds, particularly dibutyltin diacetate and dibutyltin dilaurate. Combinations of catalysts are often useful also.

In the preparation of polyurethanes, the isocyanate is reacted with the active hydrogen-containing compound(s) in an isocyanate to active hydrogen ratio of from 0.5 to 1 to 10 to 1. The "index" of the composition is defined as the —NCO/active hydrogen ratio multiplied by 100. While the extremely large range described previously may be utilized, most polyurethane processes have indices of from 90 to about 120 or 130, and more preferably from 95 to about 110. In the case of polyurethanes which also contain significant quantities of isocyanurate groups, indices of greater than 200 and often greater then 300 may be used in conjunction with a trimerization catalyst in addition to the usual polyurethane catalysts. In calculating the quantity of active hydrogens present, in general all active hydrogen containing compounds other than non-dissolving solids are taken into account. Thus the total is inclusive of polyols, chain extenders, reactive plasticizers, etc.

Hydroxyl group-containing compounds (polyols) useful in the preparation of polyurethanes are described in the *Polyurethane Handbook* in chapter 3, §3.1 pages 42–61; and in *Polyurethanes: Chemistry and Technology* in Chapter II, §§III and IV, pages 32–47. Many hydroxyl-group containing compounds may be used, including simple aliphatic glycols, dihydroxy aromatics, bisphenols, and hydroxyl-terminated polyethers, polyesters, and polyacetals, among others. Extensive lists of suitable polyols may be found in the above references and in many patents, for example in columns 2 and 3 of U.S. Pat. No. 3,652,639; columns 2–6 of U.S. Pat. No. 4,421,872; and columns 4–6 of U.S. Pat. No. 4,310,632;

these three patents being hereby incorporated by reference.

Preferably used are hydroxyl-terminated polyoxyalkylene and polyester polyols. The former are generally prepared by well known methods, for example by the base catalyzed addition of an alkylene oxide, preferably ethylene oxide (oxirane), propylene oxide (methyloxirane) or butylene oxide (ethyloxirane) to an initiator molecule containing on the average two or more active hydrogens. Examples of preferred initiator molecules are dihydric initiators such as ethylene glycol, propylene glycol, butylene glycol, neopentyl glycol, 1,6-hexanediol, hydroquinone, resorcinol, the bisphenols, aniline and other aromatic monoamines, aliphatic monoamines, and monoesters of glycerine; trihydric initiators such as glycerine, trimethylolpropane, trimethylolethane, N-alkyl-phenylenediamines, mono-, di-, and trialkanolamines; tetrahydric initiators such as ethylene diamine, propylenediamine, 2,4'-, 2,2'- and 4,4'-methylenedianiline, toluenediamine, and pentaerythritol; pentahydric initiators such as diethylenetriamine; and hexahydric and octahydric initiators such as sorbitol and sucrose. Addition of alkylene oxide to the initiator molecules may take place simultaneously or sequentially when more than one alkylene oxide is used, resulting in block, heteric, and block-heteric polyoxyalkylene polyethers. The number of hydroxyl groups will generally equal the number of active hydrogens in the initiator molecule. Processes for preparing such polyethers are described both in the *Polyurethane Handbook* and *Polyurethanes: Chemistry and Technology* as well as in many patents, for example U.S. Pat. Nos. 1,922,451; 2,674,619; 1,922,459; 3,190,927; and 3,346,557.

Polyester polyols also represent preferred polyurethane-forming reactants. Such polyesters are well known in the art and are prepared simply by polymerizing polycarboxylic acids or their derivatives, for example their acid chlorides or anhydrides, with a polyol. Numerous polycarboxylic acids are suitable, for example malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example the various aliphatic glycois, trimethylolpropane and trimethylolethane, α-methylglucoside, and sorbitol. Also suitable are low molecular weight polyoxyalkylene glycols such as polyoxyethylene glycol, polyoxypropylene glycol, and block and heteric polyoxyethylene-polyoxypropylene glycols. These lists of dicarboxylic acids and polyols are illustrative only, and not limiting. An excess of polyol should be used to ensure hydroxyl termination, although carboxyl groups are also reactive with isocyanates. Methods of preparation of such polyester polyols are given in the *Polyurethane Handbook* and in *Polyurethanes: Chemistry and Technology*.

Also suitable as the polyol are polymer modified polyols, in particular the so-called graft polyols. Graft polyols are well known to the art, and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956.

Non-graft polymer modified polyols are also preferred, for example those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

Also useful in preparing polyurethanes are monomers containing other functional groups which are reactive with isocyanates. Examples of these are preferably the amines, for example the substituted and unsubstituted toluenediamines and methylenedianilines; the alkanolamines; the amino-terminated polyoxyalkylene polyethers; and sulfhydryl terminated polymers, to name but a few. The alkanolamines and amines, particularly diamines, are particularly useful, as the amino group reacts faster than the hydroxyl group and thus these molecules can act as isocyanate chain extenders in situ without the need to prepare prepolymers. Examples of hindered, alkyl substituted aromatic diamines which are particularly useful are disclosed in U.S. Pat. No. 4,218,543.

Many isocyanates are useful in the preparation of urethanes. Examples of such isocyanates may be found in columns 8 and 9 of U.S. Pat. No. 4,690,956, herein incorporated by reference. The isocyanates which in the present invention are the commercial methylenediphenylenediisocyanates (MDI), and crude or polymeric MDI. Other isocyanates may be added in minor quantities. Other isocyanates may be found in the *Polyurethane handbook*, Chapter 3, §3.2 pages 62–73 and *Polyurethanes: Chemistry and Technology* Chapter II, §II, pages 17–31.

Modified MDI, crude MDI, and polymeric MDI are also useful. Such isocyanates are generally prepared through the reaction of the base isocyanate with a low molecular weight diol, amine, or alkanolamine, or by the reaction of the isocyanates with themselves. In the former case, isocyanates containing urethane, biuret, or urea linkages are prepared, while in the latter case isocyanates containing allophanate, carbodiimide, or isocyanurate linkages are formed.

Chain extenders may also be useful in the preparation of polyurethanes. Chain extenders are generally considered to be low molecular weight polyfunctional compounds or oligomers reactive with the isocyanate group. Aliphatic glycol chain extenders commonly used include ethylene glycol, propylene glycol, 1,4-butanediol, and 1,6-hexanediol. Amine chain extenders include aliphatic monoamines but especially diamines such as ethylenediamine and in particular the aromatic diamines such as the toluenediamines and the alkylsubstituted (hindered) toluenediamines.

Other additives and auxiliaries are commonly used in polyurethanes. These additives include plasticizers, flow control agents, fillers, antioxidants, flame retardants, pigments, dyes, mold release agents, and the like. Many such additives and auxiliary materials are discussed in the *Polyurethane Handbook* in Chapter 3, §3.4, pages 90–109; and in *Polyurethanes: Chemistry and Technology*, Part II, Technology.

Polyurethane foams generally require a surfactant to promote uniform cell sizes and prevent foam collapse. Such surfactants are well known to those skilled in the art, and are generally polysiloxanes or polyoxyalkylene polysiloxanes. Such surfactants are described, for example, in the *Polyurethane Handbook* on pages 98–101. Commercial surfactants for these purposes are available from a number of sources, for example from Wacker Chemie, the Union Carbide corporation, and the Dow-Corning Corporation.

Processes for the preparation of polyurethane foams and the equipment used therefore are well known to those in the art, and are described, for example, in the *Polyurethane Handbook* in Chapter 4, pages 117–160 and in *Polyurethanes: Chemistry and Technology*, Part II, Technology, in Chapter VII, §§III and IV on pages 7–116 and Chapter VIII, §§III and IV on pages 201–238.

For polyurethane rigid foams, the preferred polyols are those having a functionality of 3 or greater, for example polyether polyols prepared by oxyalkylating initiators such as glycerine, trimethylolpropane, pentaerythritol, toluene diamine, starch, sucrose, fructose, α-methylglucoside, and the like. When the isocyanate component comprises at least in part polymeric MDI such that the isocyanate functionality is greater than two, then the functionality of the polyol component may be reduced accordingly. To aid in reducing friability of the foam, minor portions of polyols having a functionality of two or between two and three may be added.

Polyester polyols generally have functionalities of between two and 3, generally close to or equal to 2. Suitable polyester polyols are Stepanpol ™ PS-2502 having a nominal hydroxyl number of 250. Polyester polyols are often used in conjunction with polyether polyols. Such a suitable polyether polyol is PLURACOL ® polyol 975, a sucrose/dipropylene glycol coinitiated all propylene oxide polyol having a nominal hydroxyl number of 400 and a functionality of approximately 4.4.

The isocyanate component is preferably MDI or polymeric MDI. Suitable isocyanates are, for example LUPRANATE ™ M20, M20S, M70L, and M200. Modified MDIs such as LUPRANATE ™ MM103 and LUPRANATE ™ MP-102 containing urethane and carbodiimide modified MDI may also be useful, particularly in minor quantity. Toluenediisocyanate may also be useful in minor quantities, but its use is not preferred.

The blowing agent combination useful in the subject invention comprises a mixture of an aliphatic hydrocarbon and a brominated halocarbon in a bromohalocarbon to pentane molar ratio of 0.1:1 or greater, preferably 0.1:1 to 2:1, most preferably 0.2:1 to about 1:1. It has been surprisingly found that the lower range of bromohalocarbon is critical. Bromohalocarbon/aliphatic hydrocarbon ratios of less than 0.1 not only fail to provide foams with the desired flammability characteristics, but also fail to provide foams with low K-factors.

The aliphatic hydrocarbon used as a blowing agent should have a boiling point of between −40° C. and 100° C., and preferably between 23° C. and 60° C. so that sufficient quantities of the blowing agent will volatilize during the polyurethane polymerization reaction to foam the mixture. Particularly useful aliphatic hydrocarbon blowing agents include all C-5, C-6, and C-7 isomers, and mixtures thereof. Examples of useful aliphatic hydrocarbon blowing agents include n-pentane, isopentane, cyclopentane, n-hexane, cyclohexane, dimethylbutane, and mixtures thereof. In a preferred embodiment, the blowing agent is a pentane isomer, which may contain minor amounts of other aliphatic hydrocarbons. Other materials, such as water, can be used as co-blowing agents in combination with the aliphatic hydrocarbon blowing agent, as is known in the art. Water, for example, can be used as a co-blowing agent at levels of 0–2 php (parts by weight per hundred parts of polyol).

The bromohalocarbons are fully halogenated hydrocarbons containing minimally one bromine atom, and from 1 to 3 carbons. Examples are bromotrifluoromethane, bromochlorodifluoromethane, bromodichlorofluoromethane, bromotrichloromethane, dibromodifluoromethane, bromopentafluoroethane, 1,1-dibromotetrafluoroethane, 1,2-dibromotetrafluoroethane, 1-bromo -1,1-dichlorotrifluoroethane, 1-bromoheptafluoropropane, and the like. Particularly preferred is dibromodifluoromethane. Surprisingly, partially halogenated bromohalocarbons such as dibromofluoromethane, despite the high bromine content, appear not to work.

The subjection invention will now be illustrated by the following non-limiting examples.

Examples 1–4 and Comparative Example 5

Polyisocyanurate foams at 300 index were prepared by reacting 214.2 parts Lupranate ™ M70L isocyanate with a B-side resin consisting of 90 parts Stepanpol 2502, a polyester polyol with hydroxyl number of 250 available from Stepan; 10 parts PLURACOL ® polyol 975, a sucrose/dipropylene glycol all propylene oxide derived polyether polyol having a nominal functionality of 4.39 and a hydroxyl number of 397; 2.0 parts of DC-193 silicone surfactant, a product of the Dow Corning Corporation; 1 part dimethylcyclohexylamine; 3.5 parts HEXCHEM 977 trimerization catalyst; 0.5 parts DMP-30 2,4,6-tris[dimethylaminoethyl]phenol, a trimerization catalyst available from Rohm and Haas Company, Philadelphia, Pa., 0.5 parts water, and amounts of pentane and dibromodifluromethane (DBDFM) indicated in Table 1. Amounts of pentane and DBDFM are indicated in parts on the same basis as the preceding ingredients.

TABLE 1

| Examples | Pentane | DBDFM | Mole Ratio DBDFM/Pentane | Density[1] (lb/ft$^3$) | K Factors[2] initial | 10 day | Butler[3] Chimney |
|---|---|---|---|---|---|---|---|
| 1 | 9.33 | 54.3 | 0.67 | 2.16 | 0.13 | 0.13 | 83.6 |
| 2 | 18.68 | 27.15 | 0.33 | 1.98 | 0.147 | 0.153 | 79.2 |
| 3 | 20.78 | 15.11 | 0.20 | 2.04 | 0.151 | 0.160 | 79.35 |
| 4 | 23.08 | 7.13 | 0.10 | 2.10 | 0.152 | 0.160 | 75.2 |
| 5 | 24.70 | 3.78 | 0.05 | 2.00 | 0.165 | 0.171 | 55.6 |

TABLE 1-continued

| Examples | Pentane | DBDFM | Mole Ratio DBDFM/Pentane | Density[1] (lb/ft$^3$) | K Factors[2] initial | 10 day | Butler[3] Chimney |
|---|---|---|---|---|---|---|---|
| (Comparative) | | | | | | | |

[1] Overall density. All physical properties in Table 1 are the average of two trials.
[2] K-Factor in BTU-in/ft$^2$-hr-°F.
[3] Butler Chimney Test, % weight retained.

Examples 6 and 7 and Comparative Examples 8-11

Laminate board formulations at an isocyanate index of 250 were prepared from similar ingredients but for the blowing agent. The compositions consisted of LUPRANATE™ M70L isocyanate, Stepanpol™ 2501, 90 parts; Pluracol® polyol 975, 10 parts; DC 193 surfactant, 2 parts; dimethylcyclohexylamine, 1 part; HEXCHEM 977 3 parts; DMP-30, 0.5 parts; water 0.5 parts; and blowing agent.

The amounts and types of blowing agent and the butler weight retention are presented below in Table 2.

TABLE 2

| Example | Blowing agent(s) | Amount | Density (lb/ft$^3$) | Butler Chimney Weight Retained (%) | K-Factor (Original) |
|---|---|---|---|---|---|
| 6 | Pentane[1] | 17.2 | 2.0 | 77.2 | 0.143 |
|   | DBDFM | 25.0 | | | |
| 7 | Pentane[2] | 8.6 | 1.93 | 74.1 | 0.135 |
|   | DBFM | 50.2 | | | |
| 8 (Comparative) | R-141b | 42.4 | 2.18 | 67.5 | 0.138 |
| 9 (Comparative) | R-11 | 49.6 | 1.91 | 65.7 | 0.128 |
| 10 (Comparative) | R-141b | 42.4 | 2.07 | 64.8 | 0.131 |
|   | PF5070[3] | 1.75 | | | |
| 11 (Comparative) | Pentane | 20.8[4] | 1.95 | 33.4 | — |
|   | DBFM | 6.2 | | | |

[1] Pentane/DBDFM mole ratio 2:1.
[2] Pentane/DBDFM mole ratio 1:2.
[3] Perfluorinated alkane.
[4] Pentane/DBFM mole ratio 10:1.

These, examples illustrate that the very flammable aliphatic hydrocarbon, when used in conjunction with a bromohalocarbon, produce foams with better weight retention than foams prepared with non-flammable R-11, a conventional blowing agent, and R-141b, a relatively new CFC alternative, even when the latter is combined with perfluorinated alkane.

Examples 12-16

Polyurethane foams at an isocyanate index of 250 were prepared to compare the effectiveness of bromohalocarbons versus bromine-free halocarbons at reducing the flammability of aliphatic hydrocarbon-blown polyurethane foams. The foams were prepared by reacting 1.8-1.9 parts LUPRANATE™ M70L isocyanate, 90 parts Stepanpol™ 2501, 10 parts Pluracol® polyol 975, 2 parts DC 193 surfactant, 0.5 parts DMP-30 triamine catalyst, 0.5 parts water, and blowing agent mixtures of n-pentane with either dibromodifluromethane (invention) or R-11, trichlorofluoromethane (comparison) as shown in Table 3 below.

The flammabilities of the foams as measured by Butler weight retention are set forth in the Table 3 below.

TABLE 3

| Example | Blowing Agent | Butler Weight Retention |
|---|---|---|
| 12 (Control) | 100% n-pentane | 21% |
| 13 | n-pentane/CBr$_2$F$_2$ (90:10) | 84% |
| 14 (Comparison) | n-pentane/R-11 (90:10) | 36% |
| 15 | n-pentane/Cbr$_2$F$_2$ (75:25) | 83% |
| 16 (Comparison) | n-pentane/R-11 (75:25) | 56% |

What is claimed is:

1. A rigid polymer foam having enhanced flame retardant properties prepared by reacting an organic polyisocyanate with one or more polyols at an isocyanate index of from 90 to 500, said foam comprising a blowing agent mixture comprising an aliphatic hydrocarbon and a fully halogenated bromohalocarbon having at least 1 bromine atom and from 1 to 3 carbon atoms at an aliphatic hydrocarbon/brominated halocarbon mole ratio of about 10:1 to 1:2.

2. The foam of claim 1 wherein one of said polyols is a polyester polyol.

3. The foam of claim 1 wherein said isocyanate index ranges from about 200 to about 350.

4. The foam of claim 1 wherein said bromohalocarbon contains from 1 to 3 carbon atoms.

5. The foam of claim 2 wherein said bromohalocarbon contains from 1 to 3 carbon atoms.

6. The foam of claim 3 wherein said bromohalocarbon contains from 1 to 3 carbon atoms.

7. The foam of claim 1 wherein said bromohalocarbon is dibromodifluoromethane.

8. The foam of claim 2 wherein said bromohalocarbon is dibromodifluoromethane.

9. The foam of claim 3 wherein said bromohalocarbon is dibromodifluoromethane.

10. The foam of claim 1 wherein said aliphatic hydrocarbon has 5, 6, or 7 carbon atoms or a mixture of aliphatic hydrocarbons having 5, 6, or 7 carbon atoms.

11. The foam of claim 2 wherein said aliphatic hydrocarbon has 5, 6, or 7 carbon atoms or a mixture of aliphatic hydrocarbons having 5, 6, or 7 carbon atoms.

12. The foam of claim 1 wherein said aliphatic hydrocarbon is a pentane isomer.

13. The foam of claim 2 wherein said aliphatic hydrocarbon is a pentane isomer.

14. The foam of claim 3 wherein said aliphatic hydrocarbon is a pentane isomer.

* * * * *